March 6, 1956 — D. L. WAUGH — 2,737,468

CONE TYPE BELT

Filed Oct. 25, 1952

INVENTOR.
DALE WAUGH
ATT'Y.

United States Patent Office 2,737,468
Patented Mar. 6, 1956

2,737,468

CONE TYPE BELT

Dale L. Waugh, Dayton, Ohio, assignor to The Dayton Rubber Company, a corporation of Ohio Application October 25, 1952, Serial No. 316,828

5 Claims. (Cl. 154—52.1)

This invention relates to belts, and more particularly to belts for use in variable speed power transmission drives involving a combination of conical sheaves.

In conical pulley drives, the axis of flexure of the belt as it passes around the sheaves is angular to the rotational axes of these sheaves and of the belt taken as a whole. As a result of this angularity, the tensile stress of the driving force is not evenly distributed transversely of the belt and alternates from one edge of the belt to the other as the belt passes over oppositely inclined sheaves. This alternating stress differential near the edges of the belt causes excessive wear and premature belt failure.

Furthermore, belts of this type are commonly used with a shifting fork which engages the edges of the belt at a point between pulleys, and the sliding contact between belt and fork causes further wear on the belt edges.

It is an object of this invention to provide a belt capable of continued satisfactory use in a conical pulley variable speed power transmission drive.

It is another object of this invention to provide a belt, the edges of which are longitudinally extensible so as to minimize the undersirable effects of the above-mentioned transversely alternating tensile stress variations.

It is a further object of this invention to provide a belt, the outer edges of which are laterally reinforced and outwardly protected so as to resist the wearing effects of this type of drive.

These and other objects of this invention to be disclosed in the following description I propose to achieve by constructing a belt of rubber-like material, rubberized fabric, and inextensible cord. This belt is of greater width than thickness and comprises a centrally positioned load carrying portion of inextensible strength cords embedded in a rubber composition, a longitudinally extensible lateral reinforcing portion laterally adjacent to each edge of said load carrying portion and an outer cover of rubberized fabric encasing and protecting the whole. The lateral reinforcing members are so constructed as to be longitudinally extensible thereby allowing the belt edges near which they lie to expand freely as these edges undergo the stress caused by passing over a surface which is inclined to the belt's flexural axis. As will hereinafter be more fully described, I obtain the desired lateral reinforcement and longitudinal expansibility by the use of various combinations of superimposed strips of rubberized fabric and rolls of bias-cut rubberized fabric underlying each edge of the belt.

The use of these edge reinforcing portions so adapts the belt of the invention to the demands of an oppositely tapered cone drive that the bottom pulley contacting surface of the belt may be sraight as opposed to previously proposed convex or tapered bottom surfaces. Where that part of the bottom surface of the belt underlying the layer or layers of inextensible strength cords is straight, there will be no vertical distortion to the transverse alignment of the strength cords as the belt passes over a pulley. On the other hand, where the previously proposed convex or tapering bottom surfaces underlie the strength cords, the belt, in passing over a pulley, will tend to flatten to the surface of such pulley thereby causing the previously straight alignment of strength cords to become downwardly concave. This distortion of cords results in uneven load distribution which overloads certain of the cords and seriously reduces belt life. Thus the use of a straight bottom belt made possible by this invention will further increase the operating efficiency and useful life of the cone pulley drive.

Before proceeding with the following detailed description with reference to the annexed drawings, I wish it to be understood that the examples and specific embodiments of the invention disclosed herein are for descriptive purposes only and do not limit the scope of this invention as particularly defined in the subjoined claims.

Figure 1:
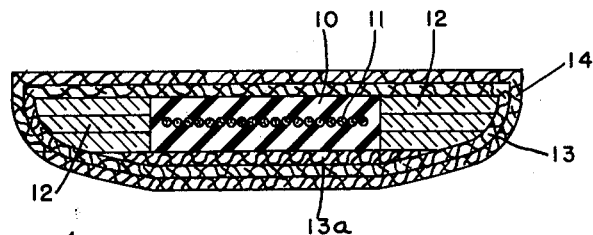
Figure 1 is a vertical transverse section through a typical belt embodying the principles of this invention.

The belt as shown in Figure 1 includes a rubber-like core 10 having a generally rectangular cross section which extends throughout the length of the belt. Embedded in this core 10 and passing longitudinally throughout its neutral axis is a transverse alignment of one or more plies of inextensible cord 11.

About the edges of the core 10 thus formed as a center, superimposed layers of loosely woven cord fabric strips 12 are laid so that the strong warp cords extend laterally while the loose filler threads extend longitudinally of the belt. The filler threads serve only to facilitate handling of the cords in the formation of the belt and are loosely woven so as to allow unimpeded variation in the longitudinal spacing of the laterally extending cords. This arrangement allows the desired longitudinal extension of the belt edges while at the same time imparting the desired lateral support to resist weakening of the edges.

Placed circumferentially of the belt about the inner surface of the core 10 and lateral cords 12 described above is a cushioning and shaping layer 13a which is shown as being composed of a bias-cut rubberized woven fabric. Additional layers of varying widths may be used depending upon the shaping effect desired. In place of the bias-cut woven fabric, a straight-laid woven fabric or laterally-laid cord fabric may be used for the shaping layers.

In the structure of Figure 1, the shaping layer 13a is wider than the rubber core 10, so that the inner surface of the belt will have a substantially flat portion at the center. Tests have shown that such a belt has a longer life than belts having a convex inner surface, which results from the fact that, as the flat driving surface firmly engages the conical pulley, the center portion of the belt is not deformed, and the alignment of the reinforcing cords remains straight and parallel to the driving surface. As a belt of the type having a convex driving surface engages a pulley, however, the driving surface tends to become flat thereby imparting an inward curvature to the alignment of the reinforcing cords. This disalignment as explained above is undersirable in that it causes uneven distribution of the load and premature belt failure.

The belt thus far described is then covered with layers of rubberized bias-laid fabric 13 and 14 as shown in Figure 1, and the whole is then vulcanized. In securing the cover to the core, any type of splice may be used, but I prefer to lay the innermost cover with a longitudinal butt splice toward the inside or driving surface of the belt and to lay the outer cover with a ⅛ in. to ½ in. lap splice on the outer surface.

Figure 2:
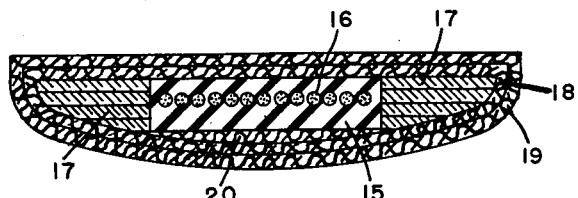
Figure 2 is a similar view of a modification of the belt of Figure 1.

In the embodiment of my invention shown in Figure 2, the rubber-like core 15 has embedded therein a layer of heavier and stronger longitudinal reinforcing cord 16. As in the structure of Figure 1, the strips of laterally-laid cord fabric 17 are placed at each edge of the core 15. The supporting layer of rubberized fabric 20 underlying the core is approximately equal in width to the width of the core, so that the bottom surface may be molded to a convex configuration as shown after the application of covers 18 and 19.

Figure 3:
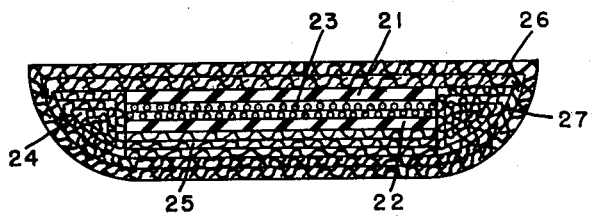
Figure 3 is a vertical transverse section of an alternative structure according to this invention.

The belt of Figure 3 has a core which comprises a plurality of layers of longitudinal strength cord 23 sandwiched between layers 21 and 22 of rubber or rubber-like material which may contain finely ground textile fibers. In lieu of the laterally-laid cord fabric of the belts shown in Figures 1 and 2, the edge reinforcing members 24 are composed of a roll of bias-cut rubberized fabric. Because the fabric of these rolls is cut and laid on the bias, that is with the warp and woof threads angularly disposed to the cut edge of the fabric, the rolls 24 will allow the edges of the belt to have the desired expansibility. A further modification in the belt of Figure 3 involves the use of a plurality of shaping or supporting layers 25 which underlie the core and are equal to its width. These layers 25 build up the bottom portion of the belt and fill the space bounded on its top by the core portion 22 and on its sides by the depending edge reinforcing members 24 so that a flat bottom may be finally imparted to the belt after covers 26 and 27 have been applied. At the same time those layers extending between the rolled fabric beads 24 provide the desired lateral reinforcement which enables them to withstand the wearing effects of the forces which act upon the belt edges. This lateral reinforcing effect might also be obtained by placing a strip or bead of fiber loaded rubber material at the center of each roll of fabric. If it is desired to provide a belt with a tapered bottom surface, additional filler layers such as those shown at 25 may be added with each added layer being narrower than the preceding layer under which it lies.

Figure 4:
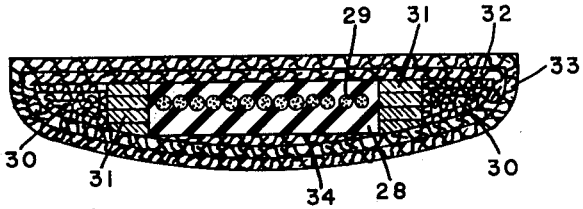
Figure 4 is a similar view of a belt structure combining features of the modifications of this invention shown in Figures 2 and 3.

Referring now to Figure 4, there is shown a belt after the manner of this invention comprising a rubber-like core 28, embedded in which are longitudinally wound cords 29, and underlying which is fabric layer 34. The edge portions of the belt shown herein, however, comprise a combination of a longitudinally extensible roll of bias-cut rubberized fabric 30 which is laterally reinforced by superimposed strips of laterally extending cord fabric 31. The covers 32 and 33 of rubberized fabric provide the necessary wear resistance to enable the belt to give continued satisfactory service.

In constructing belts of the type having edge reinforcing portions of laterally-laid cord fabric strips as described above, I have found it desirable to build both the core and edge reinforcing portions about different parts of the same mandrel. Individual cores and edge reinforcing portions are then cut from the respective parts of the drum. The belts themselves are formed by stitching the filler layer such as 13a of Figure 1, the core 10 and the edge reinforcing portions 12 in that order to the inner cover 13 which is crimped about these stitched members. The outer cover 14 is then applied in any well-known manner, and the belt is placed in a suitable mold for vulcanization.

The core is built in the conventional manner for endless type belts. For example, a 100 gauge gum rubber stock representing that portion of the core 10 lying below the strength cord 11 is wound about a suitable mandrel. The cord 11 which may be rayon treated with latex is then spun continuously so as to form concentric helices about the surface of the gum stock and a second layer gum rubber 30 to 40 thousandths of an inch thick representing that portion of the core above the cord line is wound upon this. Individual cores are then formed by cutting the sleeve thus built up about the surface of the mandrel into the desired widths which, for purposes of illustration, might be one inch.

The lateral cord fabric reinforcing portions are built by winding about one end of the same mandrel a strip of cord fabric, say eight inches wide with the warp cords lying axially of the mandrel until the desired number of plies are obtained. To facilitate cutting and handling of the individual reinforcing sections it is desirable to build the plied fabric strip about a portion of the drum which has been previously covered with the first layer of gum stock and a strip of Holland paper thereon corresponding to the width of the lateral cord layers to be applied. The cord fabric once applied should then be covered with an outer layer of Holland paper. If these steps are completed before the cord of the core portion of the drum is applied, the cord may also be spun about the Holland paper strip so as to hold the cord fabric between the layers of Holland paper in a fixed position during the cutting process. In keeping with the dimensions employed thus far in this illustration the cord fabric strip should be cut to widths of approximately one-fourth of an inch. The Holland paper together with the gum stock and the circumferential cord windings should then be stripped from the cord fabric plies which, having been impregnated with rubber, will have sufficient tack to stick together through the remainder of the building process.

In the final construction stage, a core built as described above is stitched along the center of a filler layer such as 13a of rubberized bias fabric which is approximately 1¼ in. wide. A lateral cord fabric reinforcing strip is then stitched to the filler strip adjacent each side of the core and the whole is then covered with an inner cover of rubberized bias fabric 3¼ in. wide forming a butt splice along the top of the core. If desired a second outer cover of the same rubberized bias fabric approximately 3⅝ in. wide may be applied. Where a rolled fabric bead is desired, the same may be incorporated by simply rolling the fabric along a tapered mandrel to form the bead and then stitching the same to the filler or shaping layer. Where the shaping layer is not wide enough to underlie the edge portions, the belt components may be stitched to the inside of the inner cover.

The belts thus formed may be cured in a press with suitable mold cavities to impart the desired cross sections as previously shown and described. Vulcanization should be at a temperature of approximately 290° F. for 45 minutes with a press pressure of 400 pounds per square inch.

Although the embodiments of my invention shown in Figures 2 and 4 are formed so as to present a convex driving surface, it is to be understood that all of these modifications of my invention may be used in combination with the flat driving surface of the belt in Figures 1 and 3. In this regard, it should be noted that the final shape of the belt depends not only upon the length and number of shaping layers used, but also upon the mold cavities employed during the final curing process.

It is to be understood that the forms of my invention herein shown and described are to be taken as preferred examples of the same and that various changes in the shape, size and arrangement of parts may be resorted to, without departing from the spirit of my invention, or the scope of the subjoined claims.

I claim:

1. A cone pulley drive belt comprising a flexible and inextensible core of longitudinal cords embedded in a rubber-like composition, at least one layer of laterally laid rubberized cord adjacent each side of said core and lying transversely of the longitudinal axis thereof, and a rubberized fabric cover encasing the whole.

2. A cone pulley drive belt comprising a flexible and inextensible core of longitudinal cords embedded in a rubber-like composition, at least one layer of laterally laid rubberized cord adjacent each side of said core and lying transversely of the longitudinal axis thereof, a rubberized fabric shaping layer underlying said core and a rubberized fabric cover encasing the whole.

3. A cone pulley drive belt according to claim 2 wherein said shaping layer consists of superimposed plies of rubberized fabric of an equal width which is greater than that of said core but less than that of said belt and wherein that portion of the pulley contacting surface underlying said core is straight and parallel with the alignment of said longitudinal cords.

4. A cone pulley drive belt according to claim 2 wherein said shaping layer consists of superimposed plies of rubberized fabric which decrease in width and wherein that portion of the pulley contacting surface underlying said core is convex.

5. A cone pulley drive belt comprising a flexible and inextensible core of longitudinal cords embedded in a rubber-like composition, laterally reinforced beads of rolled bias-cut rubberized fabric along each edge of said belt, and a rubberized fabric cover encasing the whole, said beads being laterally reinforced by superimposed strips of rubberized cords lying transversely of the longitudinal axis of the belt between and coextensive with the sides of said core and the respective beads.

References Cited in the file of this patent

UNITED STATES PATENTS

| | | |
|---|---|---|
| 1,438,370 | Fisher | Dec. 12, 1922 |
| 1,969,792 | Gates | Aug. 14, 1934 |

FOREIGN PATENTS

| | | |
|---|---|---|
| 254,898 | Switzerland | Jan. 3, 1949 |